United States Patent [19]

Goins, Jr. et al.

[11] Patent Number: 4,865,643

[45] Date of Patent: Sep. 12, 1989

[54] SMELTING PROCESS FOR MAKING ELEMENTAL SILICON AND ALLOYS THEREOF, AND APPARATUS THEREFOR

[75] Inventors: Curtis W. Goins, Jr., Waterford, Ohio; Earl K. Stanley, Frederick, Md.

[73] Assignee: Globe Metallurgical, Inc., Beverly, Ohio

[21] Appl. No.: 157,464

[22] Filed: Feb. 17, 1988

[51] Int. Cl.$^4$ .......................... C21C 5/52; C22B 4/00
[52] U.S. Cl. ............................ 75/10.63; 75/10.50; 75/10.53; 423/348; 423/349; 423/350; 373/9
[58] Field of Search .................... 423/348–350; 75/10.53, 10.63, 10.50; 373/9

[56] References Cited

U.S. PATENT DOCUMENTS

| | | | |
|---|---|---|---|
| Re. 13,208 | 2/1911 | Johnson | 373/58 |
| 944,774 | 12/1909 | Cote et al. | 373/56 |
| 980,763 | 1/1911 | Cote et al. | 373/3 |
| 1,442,033 | 1/1923 | Sem et al. | 373/89 |
| 1,492,038 | 4/1924 | Leonarz | 373/91 |
| 1,660,150 | 2/1928 | Cobb | 75/10.29 |
| 2,268,779 | 1/1942 | Seifert | 75/67 |
| 2,805,929 | 9/1957 | Udy | 75/10.53 |
| 3,215,522 | 11/1965 | Kuhlmann | 423/350 |
| 3,501,289 | 3/1970 | Finkl et al. | 75/12 |
| 3,524,004 | 8/1970 | Van Nostran et al. | 373/14 |
| 3,570,831 | 3/1971 | Rouanet | 266/34 |
| 3,952,138 | 4/1976 | Nanjyo et al. | 373/12 |
| 4,147,887 | 4/1979 | Yasukawa et al. | 373/18 B |
| 4,450,003 | 5/1984 | Herold et al. | 75/10 R |

Primary Examiner—Peter D. Rosenberg
Attorney, Agent, or Firm—Vorys, Sater, Seymour & Pease

[57] ABSTRACT

A smelting process for making elemental silicon and alloys thereof is disclosed. The smelting process is of the electrometallurgical type for producing elemental silicon from silicon dioxide including silicon alloyed and silicon in a substantially pure form. The process includes establishing and maintaining countercurrent contact between collected oxide and a bed of carbonaceous reductant for reducing at least part of the collected oxide to additional elemental silicon.

15 Claims, 3 Drawing Sheets

SMELTING PROCESS FOR MAKING ELEMENTAL SILICON AND ALLOYS THEREOF, AND APPARATUS THEREFOR

DESCRIPTION

1. Technical Field

This invention relates generally to the smelting art, and more specifically to electrometallurgical methods and apparatus for producing elemental silicon from silicon dioxide including silicon alloyed and silicon in a substantially pure form.

2. Background Art

Elemental silicon is useful in its straight, unalloyed form and alloyed as ferrosilicon for metallurgical and other purposes. Accordingly, reference herein to the production of elemental silicon or silicon metal can refer to the production of that element in an unalloyed form, in an alloyed form, or in both these forms simultaneously.

Customary arc type smelting practice involves the use of a submerged arc electrometallurgical furnace. Typically the furnace feed comprises quartz and carbonaceous reducing agent such as a coal, coke, woodchips, charcoal, or a mixture of some of these. For alloy preparation the feed also includes an alloying metal such as iron.

In the furnace operation intensely hot plasma is established beneath the furnace burden, i.e., the permeable mass of charge materials in the furnace body in various stages of physical and chemical modification resulting from the heat and ensuing reactions. Liquid metal product collects in the furnace, and it is tapped off periodically or continually. Gases, including carbon monoxide and gaseous silicon oxide, are formed and given off. They percolate upwardly through the burden. Some reactions take place between the gases and the other furnace materials during the relatively short residence time in the burden. A significant amount of the gases escape from the burden. If not collected in some manner, this is a total loss of gaseous material and all the energy and material value it represents.

Reducing conditions for converting the mixture of carbonaceous reducing agent and silicon dioxide into liquid phase elemental silicon in a smelting operation are basically a temperature high enough to liberate the metal and fuse it, typical of an arc furnace, and an excess of carbonaceous reductant for the reduction of the silica according to the overall reaction:

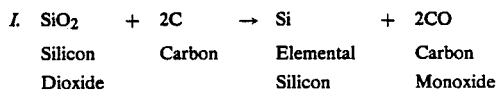

I. $SiO_2$ + 2C → Si + 2CO
   Silicon    Carbon    Elemental    Carbon
   Dioxide              Silicon     Monoxide Heretofore it has been proposed to reduce an ore by blowing carbonaceous material or comminuted ore downwardly into an electric furnace through a hole in an electrode (U.S. Pat. No. 1,492,038). This would cool the electrode and warm the feed material, and it would add to gas velocity and shorten the residence time of gas in the burden.

It also has been proposed to feed crushed anthracite down a hollow, self-baking Soderberg electrode into an electric arc furnace with bottom contacts to graphitize the anthracite (U.S. Pat. No. 1,442,033). The same patent also shows coke being fed down a the hollow electrode which is surrounded by a charge of iron ore for ultimate reduction. In that embodiment, air or other oxidizing gas is fed into the surrounding ore to oxidize to carbon dioxide the byproduct carbon monoxide percolating therethrough. Fresh ore charged is preheated by the hot carbon dioxide rising around the outside of the electrode. Use of this furnace also was suggested broadly for making carborundum (with carbon monoxide being vented through the hollow electrode), nitrides, carbides, cyanides, burned lime, cement, etc.

More recently it has been proposed to produce molten steel using a low, enclosed electric arc furnace equipped with a hollow self-baking Soderberg electrode. A charge comprising iron ore pellets, semi-reduced iron, coal and dolomite drops down the electrode. Furnace off gases arise through the electrode and are withdrawn above. Molten steel or pig iron and slag are tapped off below (U.S. Pat. No. 4,147,887). The furnace also is stated to be useful for making various unspecified alloys or carbides.

U.S. Pat. No. 4,450,003 teaches that integrally sealing an electric arc furnace to collect combustible gases in the production of ferrosilicon gives rise to severe constraints in regard to all operations involving loading the raw materials into the furnace, monitoring operation of the furnace, the downward movement and distribution of the furnace charge, and operating on the electrodes as well as affecting the operating life and performance of the furnace arch. It concludes that sealing off an existing arc furnace for ferrosilicon production or building a new one sealed off is often impractical. Accordingly, it proposes to collect rising combustible gases by suction about the periphery of the burden overlying the arc zone.

Zinc metal distillate has been noted as the primary product from reducing zinc oxide ore with carbon in an electric furnace; in some cases the zinc vapor is passed through hot carbon (Re 13208, U.S. Pat. Nos. 944,774 and 1,442,033).

There seem to be no prior proposals for producing silicon or an alloy thereof such as a ferrosilicon by an arc furnace process in which gas velocity through the burden is reduced to improve operating efficiency. There also seem to be no prior proposals for combining silicon recovery with such reduction in gas velocity. Additionally, there seem to be no prior proposals concerning process or apparatus suitable for producing silicon metal in a reactor apart from the furnace, nor any for producing the coproduct silicon in an exceptionally high degree of purity from a comparatively inexpensive raw material containing a pervasive impurity such as iron oxide. In the latter instance the main product is elemental silicon of lower purity or an alloy of such silicon.

The present invention provides these features. A broad purpose is to overcome efficiency and purity problems that are present in current smelting practice. The invention enables the user to lower the gas velocity in the burden, capture a large fraction of the silicon metal values, e.g., up to 40% or more of the silicon values that otherwise would be lost as waste, preheat a portion of the carbon-containing feed, and recover carbon monoxide in a condition useful for fuel and/or other use, e.g. chemical preparation. Additionally, as some of the carbonaceous reductant is maintained apart from the furnace burden, there is more room in the furnace for other reactants; this can add to factory capacity. Furthermore, expensive raw materials can be dispensed with when making an ultrahigh purity silicon metal product, and the concurrent production of high purity silicon metal and an alloy such as a ferrosilicon can be practiced.

DISCLOSURE OF THE INVENTION

One aspect of this invention is a process for smelting silicon dioxide to produce elemental silicon in an unalloyed and/or an alloyed form which comprises:

reducing the silicon dioxide with carbon-aceous reductant under reducing conditions in the body of an electrometallurgical furnace wherein part of the silicon content of the silicon dioxide is converted into a liquid elemental silicon product and part is converted into a gaseous oxide;

tapping the liquid product from the body of the furnace;

collecting at least a portion of the gaseous oxide from the body of the furnace;

establishing and maintaining countercurrent contact between the collected oxide and a bed of carbonaceous reductant under conditions effective for reducing at least part of the collected oxide to additional elemental silicon; and recovering the additional elemental silicon.

As will be evident from the text which follows, there are two general ways in which the process can be practiced. One way is to collect the gaseous oxide with the aid of one or more hollow electrodes as drawoff tubes projecting into the furnace body, in which electrodes countercurrent contact is made between the collected oxide and a descending bed of carbonaceous reductant. This sometimes is referred to as "reflux operation" with a "reflux electrode."

The second general way is to collect the gaseous oxide with the aid of one or more drawoff tubes that project into the furnace body and exhibit little impedence to gas flow and to deliver it to an external reactor for reduction in countercurrent contact with the reductant. An external reactor returns no appreciable material to the main arc furnace. The drawoff tubes here can be, advantageously, empty hollow electrodes. Alternatively they are simply empty tubes not used for the delivery of power, each of which preferably is situated with its collecting inlet close to a hot ed (plasma zone) of an electrode which is normally a solid electrode. This operation sometimes is referred to as an "external reactor type" operation or a "high purity" operation.

Drawoff tubes, particularly those that are to carry no solids, can have more than a single gas flow channel in them, and if desired they can be other than round or oval in cross section.

Another aspect of this invention is apparatus for smelting silicon dioxide with carbonaceous reductant to produce elemental the silicon with attendant generation of a gaseous oxide of silicon which comprises:

an electrometallurgical furnace having a body disposed to accept the silicon dioxide and reductant;

electrodes disposed in the body for making a submerged arc therein;

a taphole for withdrawing liquid elemental silicon product from the body;

at least one gas drawoff tube projecting into the body and disposed for the collection of gaseous silicon oxide; and a reactor external to the body, said reactor being disposed for admitting the collected gaseous silicon oxide into counterflow contact with a moving bed of carbon, the external reactor being equipped with an inlet for collected gaseous silicon oxide, an inlet for carbonaceous reductant, an outlet for the withdrawal of additional elemental silicon product, an outlet for gas, and a heater effective for establishing and maintaining reactor temperature operative for the reduction with the reductant of at least part of the collected silicon oxide to elemental metal.

BRIEF DESCRIPTION OF THE DRAWINGS

FIG. 3 shows an a.c. arc furnace body with three hollow electrodes. FIG. 4 shows a d.c. arc furnace body with a single projecting reflux electrode and hearth return for establishing the arc. FIG. 5 shows a similar d.c. arc furnace, but with a solid electrode and a simple drawoff tube from the arc zone.

The electrodes of the first three figures are depicted schematically in line. Ordinarily they will be in a conventional triangular array.

BEST MODES FOR CARRYING OUT THE INVENTION

Figure 1:
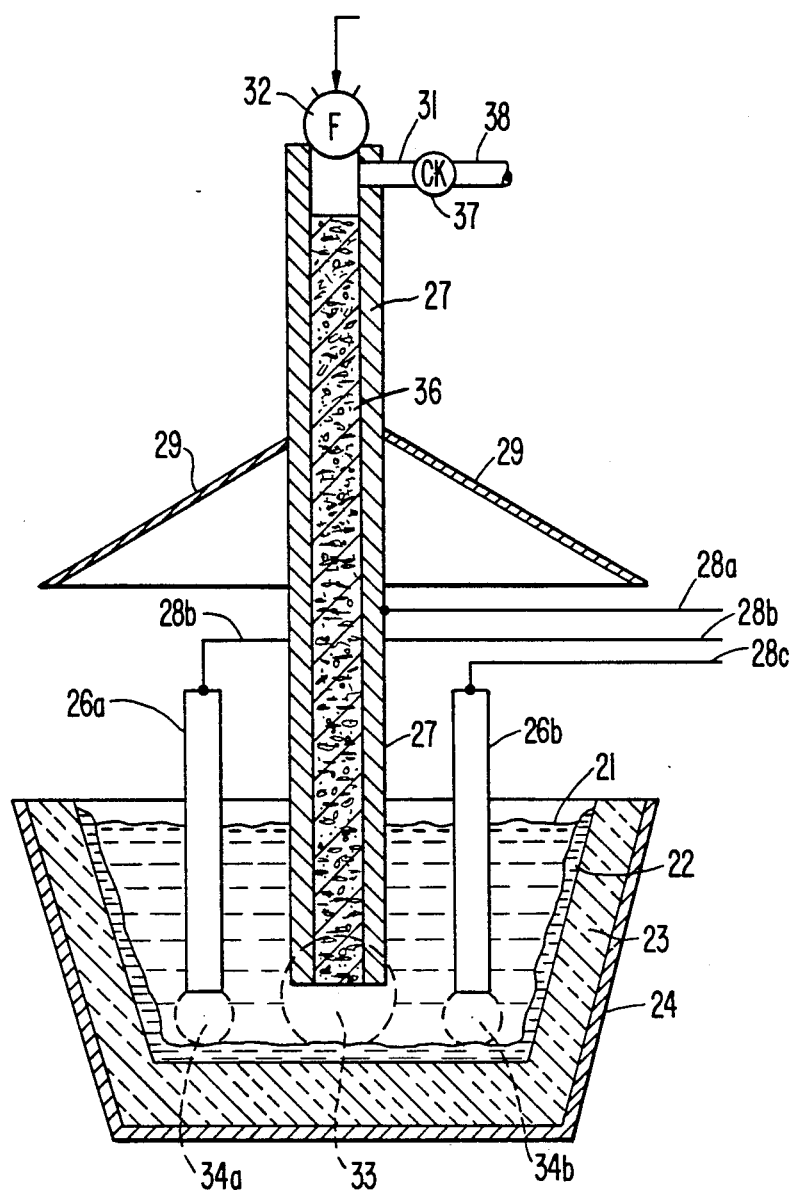
FIG. 1 of the drawings is a schematic partial cross sectional elevation of a three-phase a.c. electric arc smelting furnace for the production of elemental silicon using a single reflux electrode.

Referring to FIG. 1, a mixed furnace burden comprising quartz and bituminous coal forms upper level 21 in crucible 22. The crucible is the siliceous deposit which builds up from furnace operation; it lines and protects refractory 23 of the open top furnace body. A steel shell 24 reenforces the refractory. Reference numeral 29 refers to the roof over the furnace useful for the collection and removal of off gases with conventional equipment not shown.

Electrodes 26a, 26b and the hollow electrode 27 can be made of graphite, prebaked carbon, or self-baking carbon and are energized by three-phase a.c. power. This is brought to the electrodes by power tubes 28a, 28b, and 28c connected to conventional contact plates not shown. The burden is replenished from the open top of the furnace as needed with quartz, bituminous coal, and wood chips. Liquid silicon metal is tapped from the furnace periodically using a conventional taphole not shown.

The base of the hollow electrode 27 is disposed in the furnace to create a plasma zone 33 in the crucible and accept gas arising from the furnace for upward flow inside that electrode. The bases of solid electrodes 26a and 26b are disposed in the furnace to create plasma zones 34a and 34b, respectively. While the invention has been depicted here using three-phase a.c. power with a single hollow electrode for simplicity, it should be recognized that two or all three of these electrodes may be hollow for enhanced silicon monoxide recovery; alternatively, one or more hollow electrodes can be used in general accordance with another preferred way of operating, e.g., that of FIG. 2.

Returning to FIG. 1, feeder 32 is used for the periodic feeding of solid carbonaceous reductant, i.e., coal and wood chips, into the hollow electrode to replenish the bed of reductant 36; this bed descends in a net countercurrent relationship to gas ascending in electrode 27. Carbon monoxide-rich gas is withdrawn from the electrode 27 via line 31, damper 37 and outlet 38. The damper can be of the pivoted, butterfly, slide, louvered or other conventional type to permit outflow of, but prevent inlet of gas. A useful solid reductant feeder is a pocket feeder (also known as a "star" or "revolving door" feeder). It permits delivery of the solid reductant into electorde 27 while preventing escape of gas from that hollow electrode. Alternatively, plunger feeders, screw feeders, and rotating vane feeders can be used. The length of the hollow electrode advantageously is 15-30 feet to permit much heat exchange between the ascending gases and descending solids.

To preclude substantial bridging or clogging, the internal diameter of hollow electrode 27 is preferably at least 15 to 20 inches. Preferably, the outside diameters of hollow electrodes having the foregoing specific internal diameters are 30 inches and 60 inches, respectively. Means for applying a slight suction, e.g., a fan, compressor, or aspirator, to gases exiting outlet 38 ordinarily is not contemplated but can be installed as necessary or desired. Typically the slight positive pressure of gas in the furnace is depended upon to establish gas flow in the hollow electrode.

Figure 2:
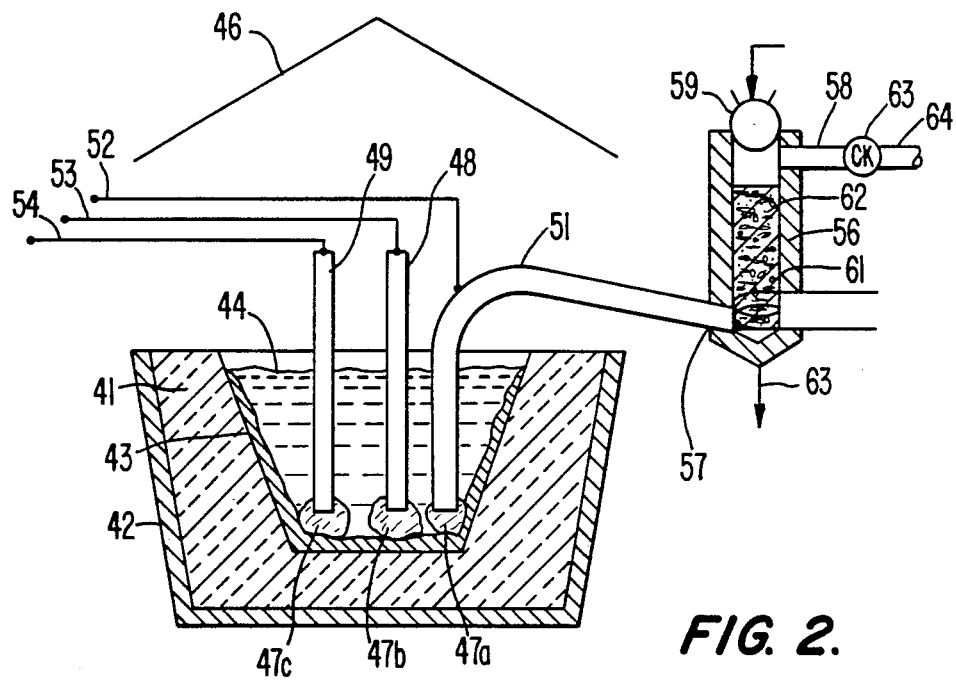
FIG. 2 also is a schematic partial cross sectional elevation of a furnace like that of FIG. 1 except that, instead of there being a reflux electrode for gas drawoff, there is a single empty hollow electrode as the gas drawoff tube; gas comprising silicon monoxide flows through it and into an external reactor for the coproduction of a very pure grade of silicon in that reactor.

Referring to FIG. 2 the submerged arc electric furnace body 41 of refractory is reenforced by steel shell 42 and lined with protective siliceous deposit 43 that builds up with use. A mixed furnace burden comprising lumps of quartz, bituminous coal and coarse wood chips forms upper level 44; the burden is replenished from the top as needed. Item 46 represents the roof of the furnace used for the conventional collection and removal of off gases.

Solid carbon electrodes 48, 49 and the hollow carbon electrode 51 are energized by three-phase a.c. power. This is brought to the electrodes by power tubes 52, 53 and 54 connected to conventional contact plates not shown.

In operation plasma zones form at the bases of the electrodes that project into the furnace body. These are depicted at 47a, 47b and 47c. Furnace product silicon in liquid form, typically about 98% purity, collects at the bottom of the furnace and is tapped off periodically using a conventional taphole not shown. A large part of the silicon monoxide and attendant carbon monoxide formed in the furnace is collected by the hollow electrode 51. These gases are withdrawn through that electrode and pass into an external reactor 62, entering at inlet 57. The reactor 62 has a refractory lining and a steel shell.

Additional bituminous coal and wood chips are fed periodically into the reactor 62 through the pocket feeder 69 to replenish a carbonaceous solids bed therein. Gases, preponderantly carbon monoxide, are withdrawn from the reactor 62 through the line 58, check damper 63, and outlet 64. An electric induction heater 61 maintains the silicon monoxide inlet region of the reactor 56 at a temperature substantially above 1850°. Temperature at the base of the bed 62 also could be maintained with an electric arc (not shown). Liquid elemental silicon of 99.9+% purity is withdrawn through an outlet 63. Silicon yield based on silica fed to a convential electric furnace runs about 70-85%; here a yield of more than 90% is to be expected.

A very practical way to make use of this embodiment of the instant invention is to make a silicon alloy such as ferrosilicon in the larger submerged arc furnace while producing a very high purity silicon in the external reactor. In this manner not only can siliceous charge material contaminated with an alloying element like iron be used efficiently and effectively for making the silicon alloy but also for making a higher purity silicon coproduct than the purest sort possible from a conventional furnace, all without resort to use of a purer, more expensive $SiO_2$ furnace charge stock. Additionally, two products are being produced simultaneously so that extra shutdowns to shift from production of a silicon alloy to the production of elemental silicon need not be scheduled.

Figure 3:
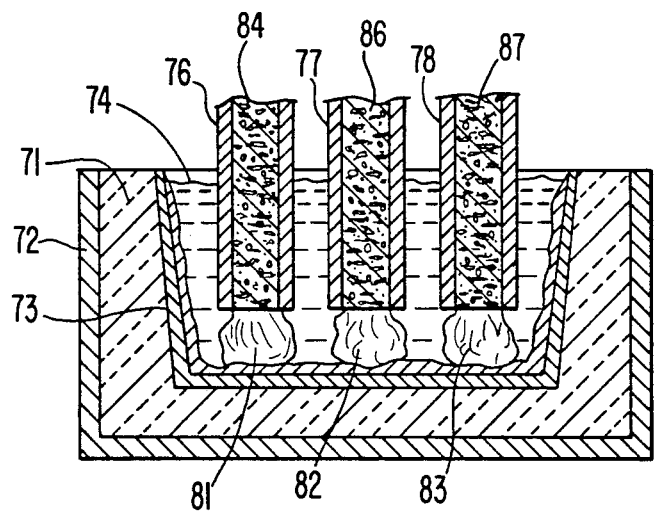
FIGS. 3, 4 and 5 are schematic fragmentary cross sectional elevations of electric arc furnace bodies with only the lower parts of the projecting electrodes depicted.

Referring to FIG. 3, a refractory furnace body 71 holds the crucible 73 and the burden 74, and it is jacketed by a steel shell 72. As this equipment and operation generally is like that of the three phase a.c. operation described for FIG. 1, only the lower ends of its three hollow electrodes are shown. Thus, the structure shown and the electric power tubes, roof, gas outlets on and feeders for solids to the electrodes, not shown, will resemble the corresponding items of FIG. 1, and operation will be like that described in connection with FIG. 1, except that equipment items will be, where necessary or desirable, in multiple or manifolded and electrically insulated from each other.

The hollow electrodes 76, 77 and 78 have at their bases plasma zones 81, 82 and 83, respectively. Each electrode contains a descending bed of solid carbonaceous reductant replenished by feeds to the top of the electrodes, not shown. These descending beds go counterflow to gases arising from the plasma zones. An especially high yield of silicon based on silica can be expected from this unit.

Figure 4:
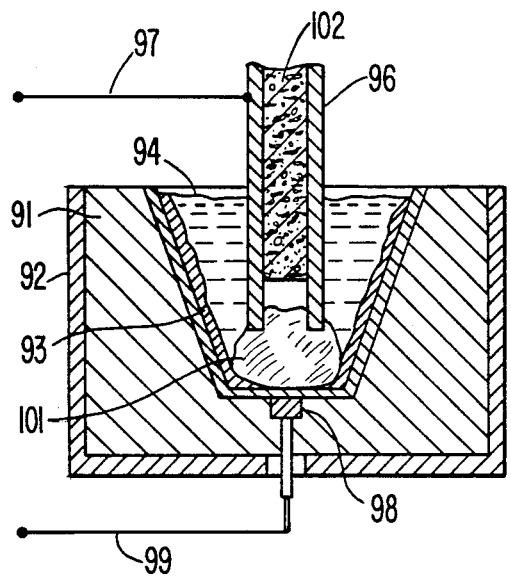

FIG. 4 uses a single hollow electrode 96 with a conventional hearth return through an electrode 98, the power being d.c. power in a circuit comprising electrodes 96 and 98, power leads 97 and 98, and a source of external d.c. power not shown.

Like the embodiments shown in FIGS. 1 and 3, the refractory furnace body 91 holds the crucible 93 and the burden 94, and it is jacketed by a steel shell 92. The burden is replenished from the open top of the furnace as needed with quartz, coal and wood chips. Liquid silicon metal product is tapped from the furnace using a conventional taphole not shown. The arc or plasma zone 101 is at the base of the hollow electrode. Descending in that electrode is a bed of supplemental solid carbonaceous reductant 102 replenished by a feeder at the top of the electrode, not shown. Counterflow to these solids in the electrode is an ascending flow of gas arising from the plasma zone. Gas is withdrawn from the electrode through a damper, not shown. An especially high yield of silicon based on silica can be expected from this unit where the needed d.c. power is available and a smaller unit size is adequate.

Figure 5:
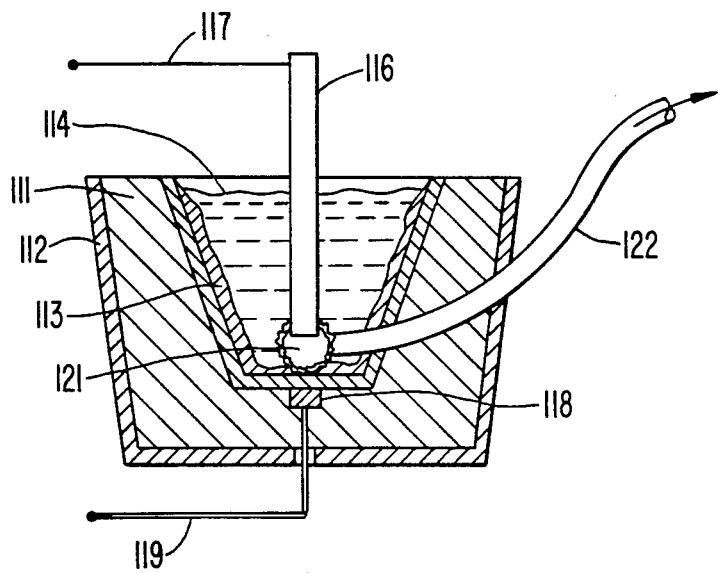

FIG. 5 uses a single solid electrode 116 with a conventional hearth return through an electrode 118. Like the apparatus of FIG. 4, the power is d.c. power in a circuit comprising the electrodes 116 and 118, power leads 117 and 119, and a source of external d.c. power not shown.

Like the embodiment shown in FIG. 4, the refractory furnace body 111 holds the crucible 113 and the burden 114, and it is jacketed by a steel shell 112. The arc or plasma zone 121 is at the base of the electrode 116. The burden is replenished from the top of the furnace as needed with quartz, coal and wood chips. A liquid silicon product is tapped from the furnace body using a conventional taphole not shown. When iron metal is included in the burden, a ferrosilicon is the tapped product.

A gas drawoff tube 122 of graphite leads gases including carbon monoxide and silicon monoxide from the plasma zone upwardly to an external reactor, not shown. The external reactor is like that of FIG. 2 and is operated in essentially the same way to provide a very high purity silicon metal product.

As can be understood from the foregoing description of the drawings, the main furnace product is silicon in a fairly pure or an alloyed form, a minor part of the silicon dioxide fed is converted into a gaseous oxide, that gaseous oxide is collected and passed into countercurrent contact with a bed of carbonaceous solids having a base or bottom zone maintained in an extremely hot state whereby the collected gaseous oxide is further reduced to additional elemental silicon, and that additional silicon is recovered by returning it to the furnace or accumulating it as a separate product.

The extremely high temperature of the plasma in an electric arc furnace fed as it is here tends to generate some gaseous oxide of silicon directly or indirectly, as by interaction of a furnace feed material such as the silicon dioxide fed, the product silicon metal, and/or an intermediate material. Recovery of an appreciable part if not all of the gaseous silicon oxide is as a liquid or solid. Silicon dioxide can, while being reduced with carbon in an electric arc, be converted into a gaseous silicon oxide wherein the silicon is in a lower state of valence than that of the silicon dioxide feed itself. Thus, silica can yield an appreciable proportion of silicon monoxide vapor, e.g., from silicon dioxide reacting with elemental silicon present. This silicon monoxide must be reduced further to obtain elemental silicon from it.

Stripping silicon monoxide from a carbon monoxide-containing gaseous furnace effluent with a counterflowing bed of carbonaceous reductant to make additional silicon metal involves maintaining the temperature of the initial contact region between reductant and effluent, usually near the base of the bed, at least about 1850° C.

One mechanism whereby silicon monoxide can be reduced is depicted by Equation II, below.

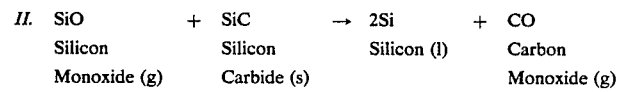

The silicon monoxide that escapes this reaction continues in countercurrent contact with the carbon bed. The bed is coolest at its top. Down to about 900° C. the carbon in the bed can form silicon carbide with any further ascending silicon monoxide as depicted by Equation III, below:

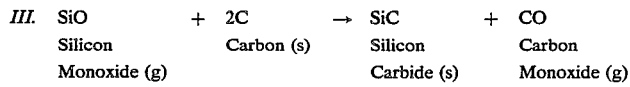

In this manner the silicon monoxide can form a "carbide front" in the descending bed.

The high temperature contact between gaseous silicon oxide and the counterflowing carbonaceous bed is due to extention of the hollow electrodes to the arc or plasma zone in the case of using reflux electrodes. When an external reactor is used, the high temperature contact is due mainly to a heater in such reactor. In either situation gases such as carbon monoxide that are collected and fed into contact with the counterflowing bed of carbonaceous solids and those that are generated in that bed ascend through the bed and warm it.

Recovery of elemental silicon from the collected gaseous silicon oxide is a main purpose of this invention. Should some of the ascending gaseous silicon escape prompt reduction to elemental form as it commences passage through the carbon bed, its chemical conversion into a solid such as silicon carbide in the bed acts to prevent its ultimate escape and to return it to the hot zone of the bed.

For making an alloy with silicon an elemental metal such as iron or nickel ordinarily is fed to the main arc furnace, although oxides of iron and nickel that will be reduced to the elemental metal in the furnace operation also could be useful. Accordingly, the term "alloying element" will be used herein to mean an elemental metal such as iron or nickel and/or an oxide thereof that is thus reducible. A rich silicon content is needed in the ferrosilicon being made here, e.g. more than 50% and preferably 75-90%, to have appreciable silicon monoxide in the furnace gas.

Carbonaceous reductant for feed to the furnace, feed to a hollow electrode, and feed to an external reactor can be one or a mixture of the following coals, e.g., bituminous and/or anthracite; coke including petroleum coke; charcoal; and wood chips. Advantageously such reductant is fairly coarse. Drawoff tubes and hollow electrodes of other than round cross section providing good passageways for gases and/or solids are possible, although ones with round cross section are preferred. Use of more than one hollow electrode is possible, as is the use of plural channels in a hollow electrode or simple tubular conduit for furnace gases. The carbon contributed by the preferred electrodes to the reactions in the operation exemplified below is so small as usually to be ignored in making a furnace material balance. It is customary to make electrode adjustable as to position for obtaining greatest operational advantage and making corrections for attrition.

In this specification all temperatures are in ages unless otherwise expressly stated.

EXAMPLE

For the manufacture of elemental silicon there is used a three-phase alternating current submerged arc smelting furnace equipped with a 15-inch interior diameter hollow carbon electrode 30 feet tall and two solid carbon electrodes. The top of the burden that covers the electrode plasma zones is maintained about 90 inches above the hearth of the furnace by addition into the open furnace top of a mixture of ½–5 inch (largest dimension) lump quartz, nut-and-pea-size bituminous coal, and wood chips of a size which is preponderantly 5–8 inches in the largest dimension. A like mixture of carbonaceous reductant without the quartz is fed into the top of the hollow electrode to maintain a bed level therein near the top of the electrode as that bed descends slowly.

Molten silicon from the entire operation collects in the furnace. It is tapped off periodically. A large fraction of the furnace effluent gas containing silicon monoxide (e.g. from the reaction of silica with silicon) plus carbon monoxide enters the hot open base of the hollow electrode. The arc there keeps the temperature at this base well in excess of 1850°. Additional silicon metal is formed from the silicon monoxide in the hollow electrode. It drains as a liquid back to the furnace. Gas rich in carbon monoxide but substantially devoid of silicon monoxide is removed from the hollow electrode above the top of the carbonaceous bed therein.

Net effects of the exemplified operation are to: a) strip the gas ascending in the hollow electrode of practically all if not all of its silicon monoxide; b) return the elemental silicon equivalent of that monoxide directly to the furnace; c) preheat the carbonaceous reductant resident in the hollow electrode; d) produce a carbon monoxide-rich vent gas that can be used for fuel or chemical synthesis, e.g., the production of phosgene; and, e) reduce the velocity of gas ascending through the furnace burden, thereby providing it with a longer reaction time, e.g. to have its silicon monoxide content react with silicon carbide present to yield elemental silicon and/or to have such silicon monoxide react with carbon present to yield silicon carbide. Silicon yield based on silica for a conventional furnace runs about 70–85%; for the inventive process yields in excess of 90% are possible.

Many other modifications and variations of the invention will be apparent to those skilled in the art in the light of the foregoing disclosure and drawings. Therefore, it is to be understood that, within the scope of the appended claims, the invention can be practiced otherwise that has specifically been shown and described.

We claim:

1. A process for smelting silicon dioxide to produce the corresponding elemental silicon which comprises:
    reducing the silicon dioxide with carbonaceous reductant under reducing conditions in the body of an electrometallurgical furnace wherein part of the silicon content of the silicon dioxide is converted into a liquid elemental silicon product and part is converted into gaseous oxide;
    tapping the liquid product from the body of the furnace;
    collecting at least a portion of the gaseous oxide from the body of the furnace;
    establishing and maintaining countercurrent contact between the collected gaseous oxide and a bed of carbonaceous reductant under conditions effective for reducing at least part of the collected gaseous oxide to additional elemental silicon; and
    recovering the additional elemental silicon.

2. The process of claim 1 wherein the silicon of the gaseous oxide is in a state of valence lower than that of silicon dioxide.

3. The process of claim 1 wherein an alloy of silicon is being produced as the product in the body of the furnace, and an alloying element is fed thereto.

4. The process of claim 1 wherein a vent gas containing byproduct carbon monoxide is recovered from the countercurrent contact.

5. The process of claim 1 wherein the furnace used is a submerged arc furnace having a drawoff tube projecting into the body of the furnace for the collection of the gaseous oxide.

6. The process of claim 5 wherein there are a plurality of drawoff tubes.

7. The process of claim 5 wherein contact between the collected gaseous oxide and the bed of carbonaceous reductant is maintained in a drawoff tube, and the product of the contact therein is returned to the body of the furnace.

8. The process of claim 7 wherein the drawoff tube is a hollow electrode.

9. The process of claim 5 wherein contact between the collected gaseous oxide and the bed of carbon is maintained in an external reactor, and the product of the contact therein is discharged therefrom as a separate product.

10. A process for producing elemental silicon or an alloy thereof which comprises:
    establishing and maintaining a submerged arc in an electrometallurgical furnace whose burden comprises silica and carbonaceous reductant;
    collecting effluent gas containing silicon monoxide gas in a hollow electrode that projects into the burden;
    establishing countercurrent contact in said electrode between entering effluent gas and a descending bed of carbonaceous solids, the contact being maintained under conditions effective for converting an initial portion of the collected silicon monoxide gas into elemental silicon by reacting it with silicon carbide formed in a later stage of the contact, thereby leaving an ascending remainder comprising silicon monoxide gas;
    continuing the contact between the bed of carbonaceous solids and the ascending remainder under conditions effective for forming silicon carbide from the reaction between silicon monoxide gas in the remainder and carbonaceous solids of the bed;
    passing the resulting silicon carbide into contact with the entering effluent gas; and
    returning the resulting elemental silicon to the furnace.

11. In the electrometallurgical furnace production of elemental silicon or an alloy thereof wherein silica and carbonaceous reductant react to form elemental silicon and silicon monoxide gas, the improvement which comprises:
    withdrawing silicon monoxide gas from the furnace;
    in an external reactor establishing and maintaining countercurrent contact between the withdrawn silicon monoxide gas and silicon carbide at a temperature effective for reducing the silicon monoxide to elemental silicon; and recovering the resulting elemental silicon from the external reactor.

12. The process of claim 11 wherein the temperature for reducing the silicon monoxide to elemental silicon with the silicon carbide in the external reactor is not substantially below 1850° C.

13. The process of claim 11 wherein an alloy of silicon is produced in the furnace while elemental silicon is produced in the external reactor.

14. A process for producing elemental silicon which comprises reacting silicon monoxide gas with silicon carbide at a temperature not substantially below 1850° C. in a reactor external to the source of the silicon monoxide gas.

15. The process of claim 14 wherein the silicon monoxide is a byproduct from the electrometallurgical furnace production of elemental silicon or an alloy thereof.

* * * * *